United States Patent [19]

Petrzelka et al.

[11] Patent Number: 5,087,147
[45] Date of Patent: Feb. 11, 1992

[54] ASSEMBLY OF SHAFT AND HUB MEMBER

[75] Inventors: Miloslav Petrzelka, Much-Kraunüchel; Werner Hoffmann, Siegburg, both of Fed. Rep. of Germany

[73] Assignee: GKN Automotive AG, Siegburg, Fed. Rep. of Germany

[21] Appl. No.: 278,839

[22] Filed: Dec. 2, 1988

[30] Foreign Application Priority Data

Dec. 3, 1987 [DE] Fed. Rep. of Germany ....... 3740908

[51] Int. Cl.⁵ .............................. F16B 11/00
[52] U.S. Cl. ................... 403/268; 403/265; 403/266
[58] Field of Search ................ 403/267, 268, 265, 266

[56] References Cited

U.S. PATENT DOCUMENTS

| | | | |
|---|---|---|---|
| 1,291,388 | 1/1919 | Bright et al. | 403/266 |
| 4,190,479 | 2/1980 | Smith | 403/268 X |
| 4,299,508 | 11/1981 | Kerscher et al. | 403/267 X |
| 4,415,387 | 11/1983 | Newman | 403/268 X |
| 4,597,688 | 7/1986 | Pagan | 403/268 X |
| 4,653,953 | 3/1987 | Anderson et al. | 403/268 |
| 4,715,474 | 12/1987 | Wehmeyer | 403/268 X |
| 4,722,717 | 2/1988 | Salzman et al. | 403/267 X |

FOREIGN PATENT DOCUMENTS

| | | |
|---|---|---|
| 2728306 | 1/1978 | Fed. Rep. of Germany . |
| 368345 | 6/1960 | Switzerland . |
| 1018530 | 4/1964 | United Kingdom . |
| 1276074 | 6/1972 | United Kingdom . |
| 2012649 | 8/1979 | United Kingdom . |
| 1585163 | 2/1981 | United Kingdom . |

*Primary Examiner*—Andrew V. Kundrat
*Assistant Examiner*—Carol I. Bordas
*Attorney, Agent, or Firm*—Toren, McGeady & Associates

[57] ABSTRACT

An assembly of a tubular shaft member (3) preferably of fiber-reinforced plastics material and a hub member (1), the hub member having formations (5, 6) which engage the internal surface of the shaft member, and further having a surface between the formations so as to define an annular space. Passages communicate with such space at the end thereof of greatest resistance to adhesive flow, for injection of adhesive into the space and release of air therefrom, the configuration of the space causing a flow of adhesive during injection thereof which effectively drives all air out of the space. The space is configured, e.g. by being of varying radial dimension, to provide an increasing resistance to flow of adhesive in the space from one end of the space to the other.

16 Claims, 4 Drawing Sheets

ASSEMBLY OF SHAFT AND HUB MEMBER

BACKGROUND TO THE INVENTION

1. Field of the Invention

This invention relates to an assembly comprising a tubular shaft member and a member, herein termed a hub member, fitting within the shaft member, a force transmitting connection between the shaft member and hub member being established by an adhesive in a space defined between the members.

Use of an adhesive has become established as a preferred method of connecting materials which cannot be welded to one another, e.g. the connection of a shaft member made of composite (fibre-reinforced plastics) material to a hub member or journal which is made of metal. For reasons of cost and strength, the use of adhesive is superior to a mechanically interfitting connection of longitudinal teeth or the like, or by the use of fasteners such as rivets. Use of adhesive is not limited to shafts made of composite material, but is also applicable to light metals and the like.

2. Description of Prior Art

It has been proposed that an adhesive connection between the shaft member and hub member should be achieved by injection of adhesive in flowable form into a space or spaces defined between the shaft member and hub member. For example, in GB-1585163 it is proposed that the hub member should be provided with one or more helical grooves into which the adhesive is injected. In DE-3337364 it is proposed that the hub member should be provided with longitudinal grooves into which the adhesive is pressed.

These proposals, however, have disadvantages in that the injected adhesive has to travel a long distance in grooves which are of a uniform cross-section, and owing to the viscosity of the adhesive and its adhesive nature a continuous increase in injection pressure is required, which pressure is limited by the mechanical strength of the components being secured together. The limit can easily be reached before the grooves are completely filled. Further, filling such long grooves requires a great deal of time and the introduction of adhesive is particularly problematical if there are several grooves. Filling of the grooves cannot easily be monitored, so that there is a risk of either incomplete filling, or injection of excessive adhesive which can find its way into the interior of the shaft member, possibly affecting the balancing thereof. Because webs have to be provided between the grooves, both to guide the adhesive and center the shaft member and hub member relative to one another, the presence of such webs necessarily reduces the surface area available for adhesive between the members, while transmission of forces between the members takes place in localized areas rather than over a large area. Finally, it should be mentioned that the mechanical production of a hub member with formations to provide the grooves is costly.

A further proposal for an adhesive connection between a shaft member and hub member is disclosed in Japanese Utility Model Publication 62-50316. This, however, requires adhesive to be applied while the parts are not fully engaged with one another, which can only be done in the vertical position with a risk of loss of adhesive and the inclusion of air when the parts are fully assembled to each other.

SUMMARY OF THE INVENTION

It is the object of the present invention to provide an adhesively connected assembly between a shaft member and hub member, wherein the above described disadvantages are overcome or reduced.

According to the invention, we provide an assembly comprising:

a tubular shaft member;

a hub member fitting within the shaft member;

the hub member having spaced formations engaging the internal surface of the shaft member, and further having a surface between said formations so as to define an annular space between the shaft member and hub member;

an adhesive in said space;

said annular space having, from one end of the assembly to the other, an increasing resistance to flow of said adhesive in a liquid condition within said space; and two diametrically opposed passage means communicating with the end of said space of greater flow resistance, for introduction of adhesive to the space and venting of air therefrom.

Introduction of the adhesive to an assembly according to the invention is considerably facilitated. When adhesive is injected under pressure into one of the openings communicating with the space, the adhesive will tend predominantly to flow axially along the annular space, in the direction of decreasing resistance of the space to flow of the adhesive. When the adhesive has reached the other end of the annular space, it will begin to flow generally circumferentially in the space, with greatest speed at the other end of the space of least flow resistance. As a result the part of the annular space diametrically opposite that which has first filled is itself filled, but from the other end thereof, until the adhesive reaches the first end and the other opening through which air from the space has been vented during the filling process. As soon as the adhesive emerges from the venting opening, it can be assumed that there are no longer any inclusions of air in the annular space, and plugs can be inserted into the two openings.

In an assembly according to the invention, adhesive connection is achieved with the entire internal surface of the shaft member between the formations of the hub member which engage such surface. That introduction of forces to the shaft member takes place uniformly over such a large area is advantageous particularly in the case of a shaft member made of fibre-reinforced plastics material. As far as the connection with the hub member is concerned, although it is usually of a metallic material and other adhesion conditions prevail, a large area of uninterrupted adhesive connection is achieved in the same way.

There are various ways in which the annular space defined between the shaft member and hub member can be arranged to have, from one end of the assembly to the other, an increasing resistance to flow of the adhesive within the space. In one embodiment described hereafter, the internal surface of the shaft member and/or the surface of the hub member may have a surface roughness which increases from one end of the assembly to the other. The facing surfaces of the shaft member and hub member may be cylindrical, the resistance to flow of adhesive in the space being greatest where one or both of the opposed surfaces is of greatest roughness, i.e. maximum peak to valley height where the surface is looked at in magnified cross section. The desired change in surface roughness from one end of the assembly to the other may be achieved in the course of preliminary production of the component or components in question, e.g. by the use of production tooling of suitable finish. However, a subsequent process to produce the required surface finish may be preferable, e.g. by cutting a screw thread on the surface of the hub member which screw thread is of increasing depth from one end of the hub member to the other.

Alternatively, the annular space may be of increasing radial dimension from one end of the assembly to the other. This provides the maximum resistance to flow of adhesive at the end of the space which is of smallest radial dimension, and minimum resistance to adhesive flow at the end of the space which is of maximum radial dimension.

The radial dimension of the space may increase smoothly from one end of the assembly to the other. This may be achieved by having the surface of the hub member, between said formations thereof, of frusto-conically tapering configuration. Such a surface is relatively easily produced by a turning operation on the hub member. Alternatively, the radial dimension of the space may increase in steps.

Under certain conditions for example if the tubular shaft member is particularly thin-walled, if the annular space is of particularly great length, or if the centering formations of the hub member are over-sized relative to the internal dimension of the tubular shaft member, necking of the tubular member in the region generally in the center of the annular space may tend to occur. As a result, the precisely determined change of flow resistance from one end of the annular space to the other may be interfered with. To overcome this, it may be advantageous to provide the hub member, between said formations thereof, with circumferentially spaced supporting formations which engage the internal surface of the shaft member, with axial passageways being defined between the supporting formations for flow of adhesive in the space. Such supporting formations may be provided, for instance, by a knurled collar on the hub member but preferably comprise protuberances spaced at greater circumferential distances.

If the co-efficient of thermal expansion of the tubular shaft member is considerably greater than that of the hub member, for example if a fibre-reinforced plastics shaft member is combined with a metal hub member, the volume of the annular space may increase when, for the purpose of curing the adhesive, the assembly is heated. This may draw air into the annular space, which remains when the glue hardens. Also, the hub member may loosen in the shaft member, without necessarily becoming so loose that it can fall out. Such additional supporting formations, preferably dimensioned so that the tubular member is pre-stressed thereby, are useful in these circumstances.

If it is desired to increase the surface available for the adhesive connection, without increasing the axial length of assembly, a further possibility is that the hub member may comprise an annular portion extending over an end of the shaft member to define a further annular space at least partially enclosing the first said annular space and communicating therewith by apertures or passages at said end, the first said space being of increasing flow resistance towards said end and the further space being of increasing flow resistance away from said end.

When adhesive is injected into the first annular space in such an assembly, it spreads through the space in the manner above described. It then flows into the outer annular space, spreading first circumferentially therein and subsequently axially in order completely to expel the air therefrom. In this case, instead of air venting, during adhesive injection, through a passage diametrically opposed to the injection passage, venting takes place through the further annular space at the open end thereof away from the end of the shaft member.

Preferably the hub member is provided with a collar adjacent its formation which engages the internal surface of the shaft member at the end of the shaft member, the collar being of larger diameter than the formation so as to limit the depth to which the hub member can be fitted into the shaft member. At the same time, such provision permits the assembly more readily to withstand compressive axial forces.

The passage means communicating with the annular space may be constituted by respective bores extending axially in the hub member, communicating with transverse grooves or radial bores in the tapering portion of the hub member. The bores in the hub member may be threaded to receive threaded plugs or nipples providing for introduction of the adhesive.

Alternatively, radial bores may be provided in the shaft member, which bores analogously may be screw-threaded to receive connecting nipples or plugs.

If the assembly is required to have a very long region of adhesive connection, such that if there were only one opening for injection of adhesive into the annular space between the members and one opening for venting of air the flow of adhesive might not satisfactorily displace air and completely fill the space, the hub member could be provided with a further formation or formations engaging the internal surface of the shaft member so as to define more than one tapered annular space therebetween. In this case the shaft member would have to be provided with respective pairs of openings communicating with each annular space.

The invention further provides a method of making an assembly according to the invention, by injection of adhesive into the annular space defined between the shaft member and hub member, through one of the openings communicating with the space.

BRIEF DESCRIPTION OF DRAWINGS

The invention will now be described by way of example with reference to the accompanying drawings, of which.

DESCRIPTION OF PREFERRED EMBODIMENTS

Figure 1:
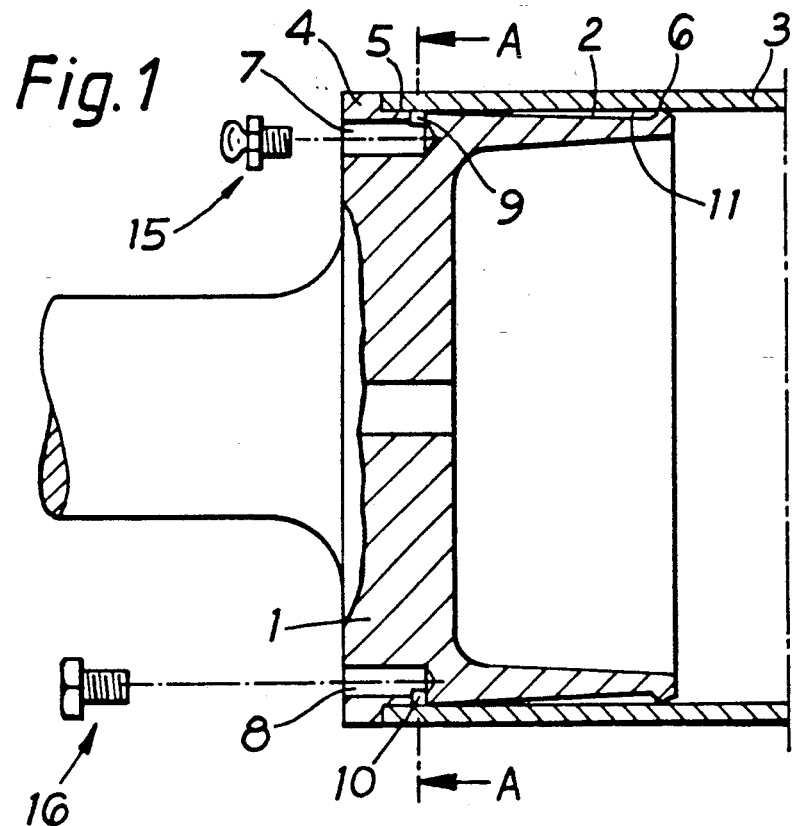
FIG. 1 is a longitudinal section through a first embodiment of assembly according to the invention.
Figure 2:
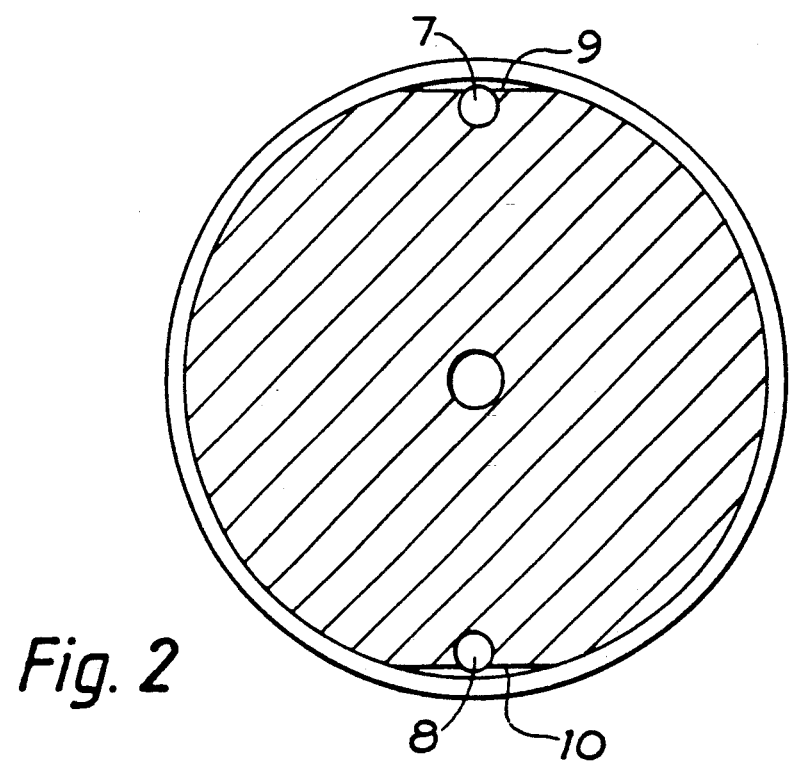
FIG. 2 is a transverse section on the line A—A of FIG. 1.

Referring firstly to FIGS. 1 and 2, there is shown a hub member 1 which is a generally cup-shaped component fitting partly within an end portion of a tubular shaft member 3 which has a cylindrical internal surface. The shaft member 3 is of composite, fibre-reinforced plastics, material, whilst the hub member 1 is of metal.

The hub member 1 has a radially outwardly extending collar or flange 4 which abuts the end of the shaft member 3 to determine the amount by which the hub member is able to fit within the shaft member. Adjacent the collar 4 the hub member has a circumferential surface portion 5 which is a close fit to the internal surface of the shaft member 3. Spaced from the formation 5 the hub member has a further formation 6 which is a similar fit within the shaft member, so that together these formations center the hub member within the shaft member. Between the formations 5, 6 the hub member has a frusto-conically tapering surface 2 to define an annular space 11 between the hub member and shaft member, the radial dimension of such annular space increasing from the formation 5 of the hub member to the formation 6 of the hub member.

The hub member has a first axially extending blind bore 7 which communicates with the annular space 11 by way of a transverse groove 9 cut in the tapering surface 2 of the hub member. The hub member has a further blind bore 8 and transverse groove 10 diametrically opposite the first said bore and groove, also communicating with the annular space 11. The openings provided by these diametrically opposed bores and grooves provide for introduction of adhesive to and venting of air from the annular space, to provide an adhesive connection between the shaft member and hub member in the manner above described. The bores 7, 8 may be screw-threaded to receive screw-in plugs, or connecting nipples to facilitate the adhesive injection and air venting, and FIG. 1 shows diagrammatically such a nipple 15 and plug 16.

Figure 3:
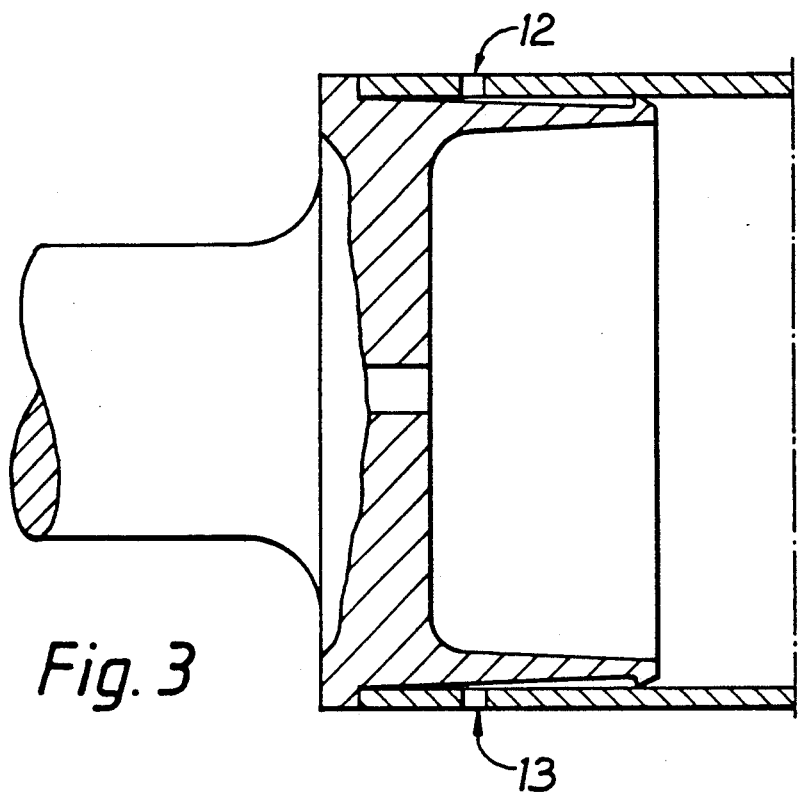
FIG. 3 is a longitudinal section through a further embodiment of assembly according to the invention.

Referring now to FIG. 3 of the drawings, this shows an assembly which comprises a shaft member and hub member the same as those of FIGS. 1 and 2 with the difference that the hub member does not have the bores 7, 8 and transverse grooves 9, 10. Communication with the annular space between the shaft member and hub member, for the purpose of introduction of adhesive and venting of air from such space, is provided by diametrically opposed bores 12, 13 extending radially through the shaft member.

Figure 4:
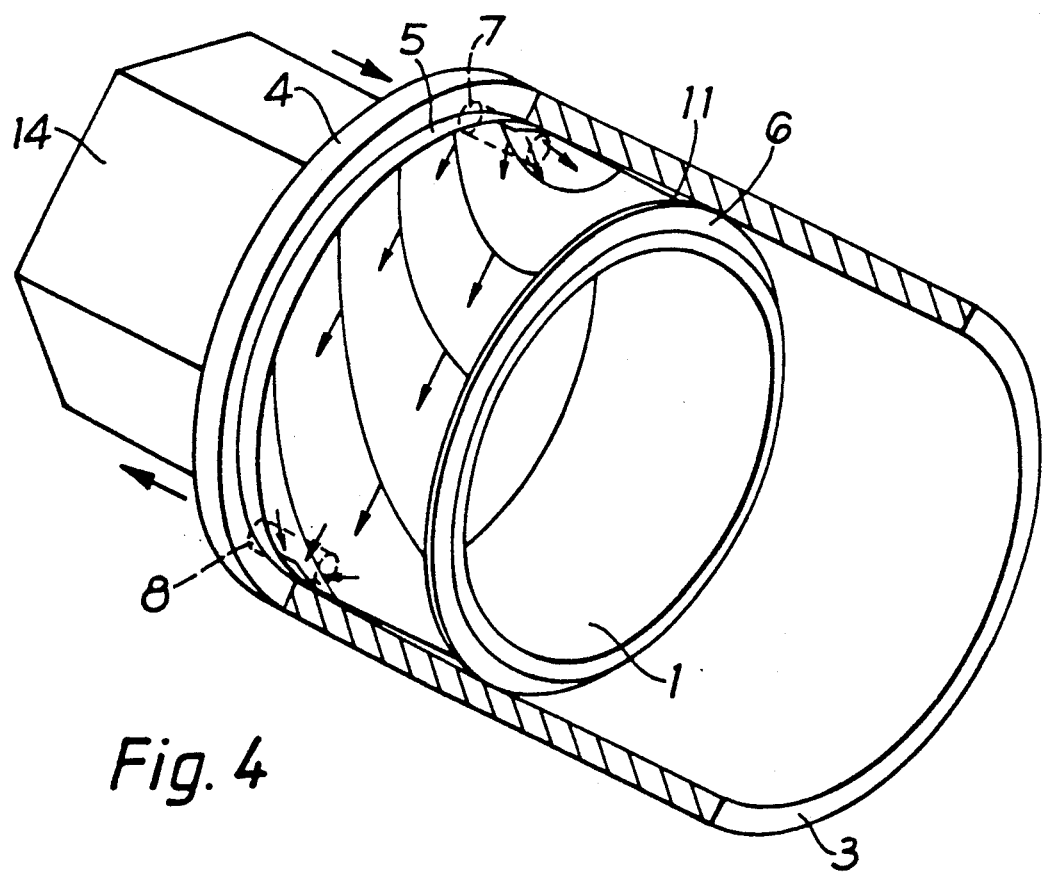
FIG. 4 is a diagrammatic broken-away perspective view of the assembly of FIG. 1, showing the flow of adhesive therein.

Referring now to FIG. 4 of the drawings, this shows diagrammatically an assembly as FIG. 1, differing slightly in that the hub member 1 is connected to a polygonal shaft portion or journal 14. The bore 7 may be provided with a lubrication-type connecting nipple 15, providing for injection of the adhesive under sufficient pressure to overcome the viscosity of the adhesive. FIG. 4 shows how adhesive spreads through the tapered annular space 11 defined between the shaft member 3 and hub member 1, when adhesive is introduced into the space through the bore 7 and groove 9. The adhesive follows the path of least resistance to its flow, firstly travelling generally axially through the space 11 to approach the formation 6 which defines the axial limit of the space 11 at its end of largest radial dimension. As the adhesive approaches the formation 6, it begins to spread circumferentially of the space. When the adhesive reaches formation 6, it spreads in opposite circumferential directions through the space 11 and finally, at the side of the space 11 diametrically opposite the bore 7, in the opposite axial direction therethrough until adhesive begins to emerge from the vent bore 8. When this happens, all or substantially all air has been expelled from the space 11, and no further injection of adhesive is required. The bores 7, 8 can then be plugged by suitable plugs as plug 16, e.g. screwed or pressed into the bores.

Figure 5:
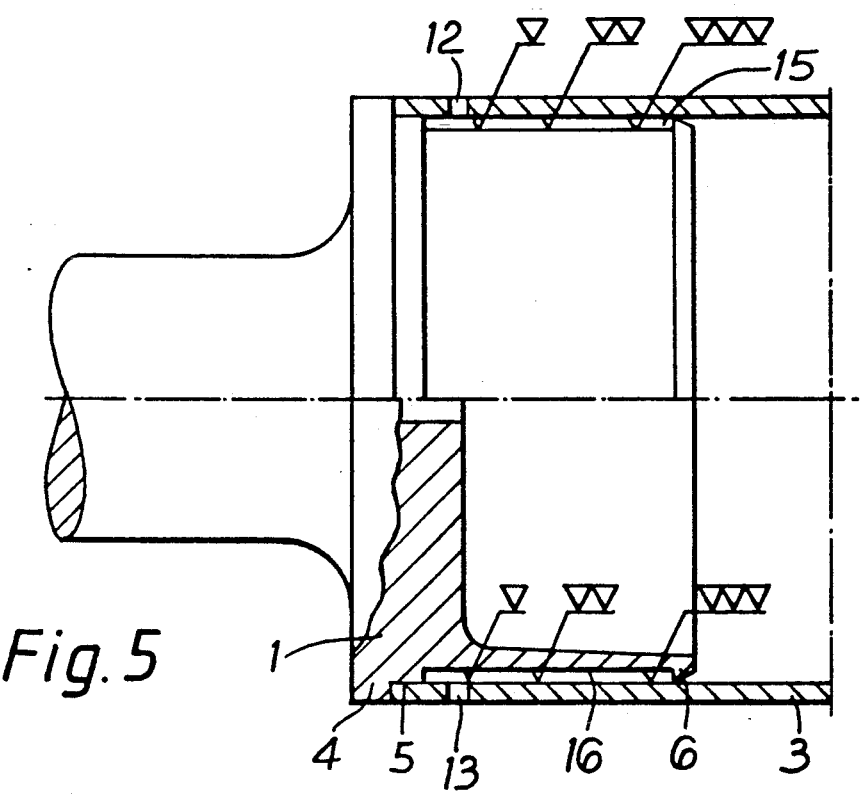
FIGS. 5, 6, 7 and 8 are longitudinal views partly in section through further embodiments of assembly according to the invention.

Referring now to FIG. 5 of the drawings, this shows partly in section an embodiment of the invention wherein parts corresponding to those previously described are accorded the same reference numerals. Thus, it comprises a hub member 1 fitting within a tubular shaft member 3 of composite material, the hub member having a collar 4 and axially spaced formations 5, 6 which engage the internal surface of the shaft member as a tight fit. Between the formations 5, 6 the hub member has a surface 16 which is cylindrical to leave an annular gap 15 of constant dimension between it and the internal surface of the shaft member. Diametrically opposed bores 12, 13 extend through the shaft member to communicate with the space 15.

As indicated by the surface finish symbols on FIG. 5, the surface 16 of the hub member and/or the internal surface of the tubular shaft member have a roughness which is greatest at the end of the space 15 with which the bores 12, 13 communicate. At the opposite end of the space 15, adjacent the formation 6, the surfaces have the finest finish. Thus the resistance to flow of adhesive in the space is greatest at the end of the space 15 with which the bores 12, 13 communicate. The effect when adhesive is injected into the space is as above described.

Figure 6:
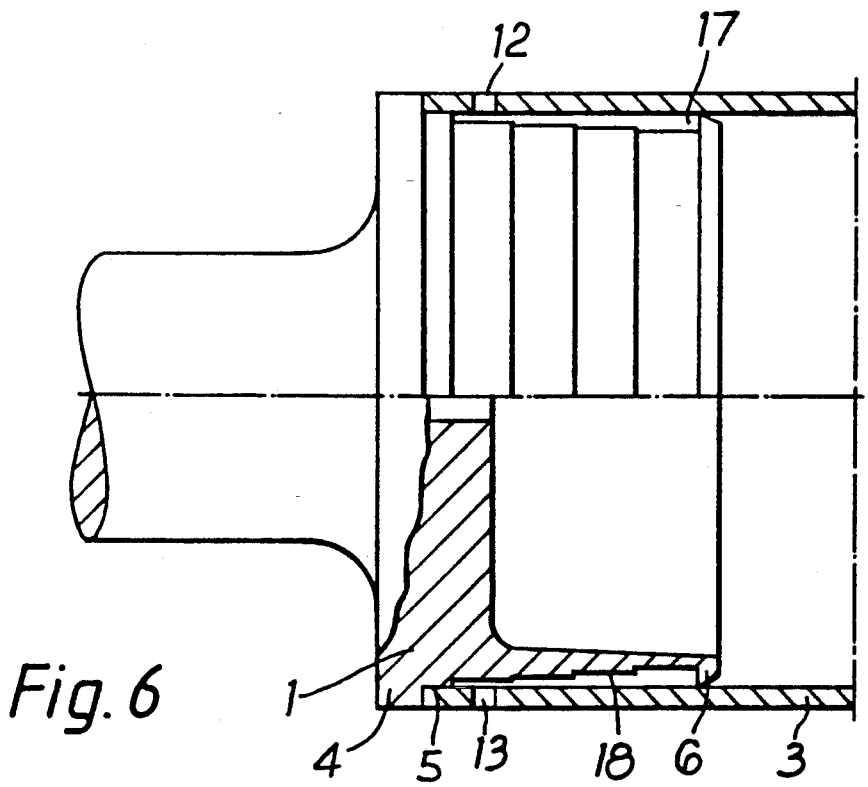

Referring now to FIG. 6 of the drawings, this shows a further embodiment wherein, again, the same reference numerals are used for corresponding features. In this embodiment, the hub member 1 has its surface 18 between its formations 5, 6 tapering in steps. The annular space 17 defined between the surface 18 and the internal surface of the shaft member 3 thus has its radial dimension tapering stepwise from a minimum at the end of the space adjacent the bores 12, 13 to a maximum at the end of the space adjacent the formation 6. The effect on flow of injected adhesive is again as above described.

Figure 7:
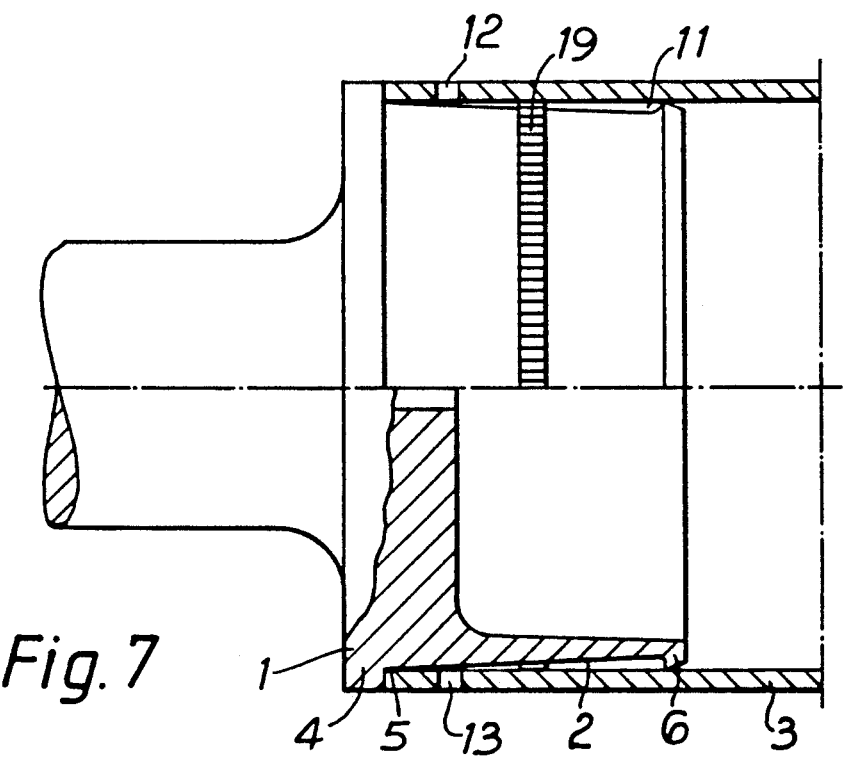

FIG. 7 shows an embodiment which is basically the same as that above described in relation to FIG. 3 of the drawings. The hub member 1 has a tapering surface 2 facing the internal surface of the shaft member, to define an annular space whose radial dimension increases linearly from one end thereof to the other. Between the ends of the annular space, the hub member has been provided with circumferentially distributed supporting elements 19 which support the shaft member by engaging the internal surface of the shaft member, but do not obstruct the axial flow of the adhesive.

Figure 8:
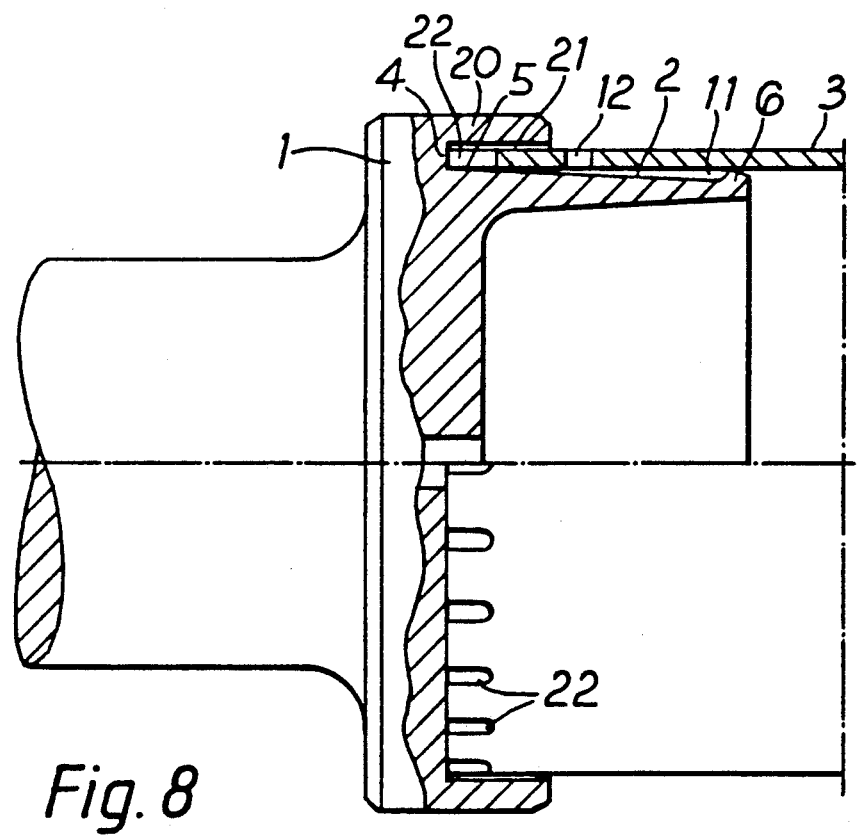

FIG. 8 shows a hub member 1 provided with the additional feature of an annular portion 20 which extends axially of the shaft member 3 on the outside thereof, to define a further annular space 21 which partially overlaps the first annular space 11 defined between the hub member and the internal surface of the shaft member. Both the spaces 11, 21 are of tapering configuration, the former being of minimum radial dimension at its end adjacent the end of the shaft member, and the latter being of minimum radial dimension at its end away from the end of the shaft member. Apertures or recesses 22 at the end of the shaft member provide for communication between the two spaces. There is only a single passage 12 communicating with the space 11 adjacent the end thereof of minimum radial dimension.

In this embodiment of the invention, when adhesive is injected through the passage 12 extending through the shaft member 3 to communicate with the space 11, the adhesive will spread through and fill the space 11 in the manner above described. It will then pass through the recesses 22 to enter the space 21, and fill the latter space in analogous manner to expel all air therefrom.

We claim:

1. An assembly comprising:
   a tubular shaft member;
   a hub member fitting within the shaft member;
   the hub member having spaced formations engaging the internal surface of the shaft member, and further having a surface between said formations so as to define an annular space between the shaft member and hub member;
   an adhesive in said space;
   means for providing said annular space, from one end of the assembly to the other, with an increasing resistance to flow of said adhesive in a liquid condition within said space; and
   two diametrically opposed passage means communicating with the end of said space of greater flow resistance, for introduction of adhesive to the space and venting of air therefrom.

2. An assembly according to claim 1 wherein said shaft member is of fibre-reinforced plastics material.

3. An assembly according to claim 1 wherein said hub member further comprises, between said formations thereof, circumferentially spaced supporting formations engaging said internal surface of the shaft member, axial passageways being defined between said supporting formations for flow of adhesive.

4. An assembly according to claim 1 wherein said passage means each comprise a bore extending axially in the hub member, communicating with a transverse formation communicating with said surface of the hub member.

5. As assembly according to claim 1 further comprising a connecting nipple in one of said passage means.

6. An assembly according to claim 1 further comprising plugs in said passage means.

7. An assembly according to claim 1 wherein the hub member is provided with a collar adjacent one of said formation thereof, of larger diameter than said formation and engaging an end face of the shaft member.

8. An assembly comprising:
   a tubular shaft member;
   a hub member fitting within the shaft member;
   the hub member having spaced formations engaging the internal surface of the shaft member, and a surface between said formations so as to define a first annular space between the shaft member and hub member;
   the hub member further comprising an annular portion extending over an end of the shaft member to define with the external surface thereof a further annular space at least partially surrounding the first said annular space and communicating therewith by passage means at said end,
   an adhesive in said space;
   means for providing the first said annular space, towards said end, with an increasing resistance to flow of said adhesive in a liquid condition within said space and means for providing the further annular space with an increasing flow resistance away from said end; and
   passage means communicating with the first said space adjacent said end of the shaft member for introduction of adhesive to the space.

9. A method of making an assembly of a tubular shaft member and a hub member fitting within the shaft member, the hub member having spaced formations engaging the internal surface of the shaft member, and further having a surface between said formation so as to define an annular space between the shaft member and hub member, said annular space having an increasing radial dimension from one end of the assembly to the other so as to have a decreasing resistance to flow of said adhesive in a liquid condition with said space from one end to the other, there being provided two diametrically opposed passage means communicating with the end of said space which has the greater resistance to adhesive flow;
   the method comprising:
   injecting adhesive into said space through one of said passage means to cause flow of adhesive firstly generally lengthwise of said space towards the end thereof of smallest resistance to adhesive flow and subsequently generally circumferentially of said space and towards the other passage means, and
   permitting release of air from said space through the other of said passage means until adhesive emerges therefrom.

10. A method according to claim 9 further comprising subsequently plugging said passage means.

11. A method of making an assembly of a tubular shaft member and a hub member fitting within the shaft member, the hub member having spaced formations engaging the internal surface of the shaft member, and a surface between said formations so as to define a first annular space between the shaft member and hub member, said space being of increasing resistance towards an end of the shaft member to adhesive flow in the space, the hub member further comprising an annular portion extending over the end of the shaft member to define with the external surface thereof a further annular space at least partially surrounding the first said annular space and communicating therewith by passage means at said end, the further said space being of increasing flow resistance away from said end; the method comprising:
   injecting adhesive into the first said annular space through a passage means communicating therewith adjacent the end of the shaft member, thereby causing flow of adhesive firstly generally lengthwise of the first said space towards the other end thereof and subsequently generally circumferentially of said space to fill the space towards the end of the shaft member, followed by flow through said communicating passage means into said further annular space to fill the latter from said end of the shaft member, and
   permitting release of air from the further said space at an end thereof away from the end of the shaft member, until adhesive emerges therefrom.

12. An assembly comprising:
   a tubular shaft member of fiber-reinforced plastics material;
   a hub member fitting within the shaft member;
   the hub member having spaced formations engaging the internal surface of the shaft member, and further having a surface between said formations so as to define an annular space between the shaft member and hub member;
   an adhesive in said space;
   said annular space being formed so as to have from one end of the assembly to the other an increasing resistance to flow of said adhesive in a liquid condition within said space; at least one of said internal surface of the shaft member and said surface of the hub member having a surface roughness which increases from one end of the assembly to the other, to provide said increasing resistance to flow of adhesive; and two diametrically opposed passage means communicating with the end of said space of greater flow resistance, for introduction of adhesive to the space and venting of air therefrom.

13. An assembly comprising:
a tubular shaft member;
a hub member fitting within the shaft member;
the hub member having spaced formations engaging the internal surface of the shaft member, and further having a surface between said formations so as to define an annular space between the shaft member and hub member;
an adhesive in said space;
said annular space having an increasing radial dimension from one end of the assembly to the other so as to have a decreasing resistance to flow of said adhesive in a liquid condition within said space from the one end to the other; and
two diametrically opposed passage means communicating with the end of said space of greater flow resistance, for introduction of adhesive to the space and venting of air therefrom.

14. As assembly according to claim 13 wherein said radial dimension of said space increases smoothly from one end of the assembly to the other.

15. An assembly according to claim 13 wherein said radial dimension of said space increases stepwise from one end of the assembly to the other.

16. An assembly comprising:
a tubular shaft member;
a hub member fitting within the shaft member;
the hub member having spaced formations engaging the internal surface of the shaft member, and further having a surface between said formations so as to define an annular space between the shaft member and the hub member;
an adhesive in said space;
said annular space being formed so as to have, from one end of the assembly to the other, an increasing resistance to flow of said adhesive in a liquid condition within said space; and
two diametrically opposed passage means communicating with the end of said space of greater flow resistance, for introduction of adhesive to the space and venting of air therefrom, said passage means each including a radial bore in the shaft member.

* * * * *